US007464179B2

(12) United States Patent  (10) Patent No.: US 7,464,179 B2
Hodges et al.  (45) Date of Patent: Dec. 9, 2008

(54) METHODS, SYSTEMS, AND PRODUCTS FOR PROVIDING COMMUNICATIONS SERVICES AMONGST MULTIPLE PROVIDERS

(75) Inventors: Donna K. Hodges, Cumming, GA (US); Barrett Morris Kreiner, Norcross, GA (US); Steven N. Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 746 days.

(21) Appl. No.: 10/720,587

(22) Filed: Nov. 24, 2003

(65) Prior Publication Data

US 2005/0114153 A1  May 26, 2005

(51) Int. Cl.
*G06F 15/177* (2006.01)
*H04N 5/445* (2006.01)
*H04N 7/173* (2006.01)
*H04J 3/16* (2006.01)

(52) U.S. Cl. .................. 709/238; 709/220; 709/222; 725/38; 725/91; 725/111; 370/468

(58) Field of Classification Search ............ 709/231, 709/223; 725/91
See application file for complete search history.

(56) References Cited

U.S. PATENT DOCUMENTS

| 5,752,186 | A | 5/1998 | Malackowski et al. |
| 5,790,176 | A | 8/1998 | Craig |
| 5,862,471 | A | 1/1999 | Tiedemann et al. |
| 5,978,780 | A | 11/1999 | Watson |
| 6,002,689 | A | 12/1999 | Christie |
| 6,016,307 | A * | 1/2000 | Kaplan et al. ............ 370/238 |
| 6,058,301 | A | 5/2000 | Daniels |
| 6,104,718 | A | 8/2000 | Christie |
| 6,178,170 | B1 | 1/2001 | Duree |
| 6,285,871 | B1 | 9/2001 | Daniels |
| 6,385,198 | B1 * | 5/2002 | Ofek et al. ............... 370/389 |
| 6,456,594 | B1 | 9/2002 | Kaplan |
| 6,516,194 | B2 | 2/2003 | Hanson |
| 6,519,693 | B1 | 2/2003 | Debey |
| 6,522,883 | B2 | 2/2003 | Titmuss |
| 6,567,375 | B2 | 5/2003 | Balachandran |
| 6,836,465 | B2 | 12/2004 | Rajan et al. |
| 6,917,628 | B2 * | 7/2005 | McKinnin et al. ......... 370/468 |
| 6,934,530 | B2 | 8/2005 | Engelhart |
| 6,950,847 | B2 | 9/2005 | Harrisville-Wolff et al. |
| 6,957,226 | B2 | 10/2005 | Attias |

(Continued)

FOREIGN PATENT DOCUMENTS

WO  WO 00/41426  * 7/2000

*Primary Examiner*—Nathan J Flynn
*Assistant Examiner*—Anish Sikri
(74) *Attorney, Agent, or Firm*—Scott P. Zimmerman, PLLC

(57) ABSTRACT

Methods, systems, and products are disclosed for providing communications services. One method receives a request for communications service. The request for communications service originates from a client communications device associated with a user and requests communications service from a service provider. An availability of at least one of i) a communications network operated by the service provider and ii) another communications network operated by another service provider is dynamically assessed in real-time. A best-value scenario of segmentation, dispersion, assemblage, and routing of electronic data is assessed to fulfill the request. The best-value scenario maximizes profitability for the service provider. The communications service is provided to fulfill the request according to the best-value scenario.

20 Claims, 9 Drawing Sheets

U.S. PATENT DOCUMENTS

| | | |
|---|---|---|
| 6,978,308 B2 | 12/2005 | Boden et al. |
| 7,155,517 B1 | 12/2006 | Koponen |
| 7,184,548 B2 * | 2/2007 | Wee et al. .................. 380/37 |
| 2001/0029544 A1 | 10/2001 | Cousins |
| 2002/0073182 A1 | 6/2002 | Zakurdauv et al. |
| 2002/0087674 A1 | 7/2002 | Guilford |
| 2002/0112060 A1 * | 8/2002 | Kato ....................... 709/227 |
| 2002/0164016 A1 | 11/2002 | Wee et al. |
| 2002/0164018 A1 | 11/2002 | Wee |
| 2002/0176378 A1 | 11/2002 | Hamilton |
| 2003/0012376 A1 | 1/2003 | Wee |
| 2003/0043815 A1 | 3/2003 | Tinsley |
| 2003/0051054 A1 * | 3/2003 | Redlich et al. ............ 709/246 |
| 2003/0088778 A1 | 5/2003 | Lindqvist |
| 2003/0093550 A1 | 5/2003 | Lebizay |
| 2003/0093790 A1 * | 5/2003 | Logan et al. ................ 725/38 |
| 2003/0126610 A1 * | 7/2003 | Ando ......................... 725/91 |
| 2003/0211856 A1 | 11/2003 | Zilliacus |
| 2004/0221053 A1 * | 11/2004 | Codella et al. ............. 709/231 |
| 2004/0249927 A1 | 12/2004 | Pezutti |
| 2005/0038637 A1 | 2/2005 | Balakrishnan |
| 2005/0060420 A1 | 3/2005 | Kovacevic |
| 2005/0094725 A1 | 5/2005 | Hui |
| 2006/0031515 A1 | 2/2006 | VanGassel et al. |
| 2006/0041679 A1 | 2/2006 | Feig |
| 2006/0206619 A1 * | 9/2006 | Dan et al. .................. 709/233 |

* cited by examiner

METHODS, SYSTEMS, AND PRODUCTS FOR PROVIDING COMMUNICATIONS SERVICES AMONGST MULTIPLE PROVIDERS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATIONS

This application relates to the copending and the commonly assigned U.S. application Ser. No. 10/720,941, entitled, "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,586, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,800, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,956, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,946, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,892, entitled "Methods for Providing Communications Services", filed concurrently herewith, and of which the "Brief Summary of the Invention" section and the "Detailed Description of the Invention" section are incorporated herein by reference.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis Module. This Analysis Module comprises methods, computer systems, computer programs, and computer program products that provide . communications services. Each time a user requests communications service, the Analysis Module analyzes the available communications networks and their available network routing and bandwidth. This invention then determines a best-value scenario for providing the user's requested communications service. The term "best-value scenario," as used herein, means the Analysis Module strives to maximize profit for a service provider given one or more constraints when providing the user's requested communications service. The term "best-value scenario," for example, might mean the lowest cost routing arrangement. The term "best-value scenario," however, might also mean the maximum profitability for the service provider and/or network operator. The term "best-value scenario" could also mean maximizing profit while still satisfying a Service Level Agreement. Once the best-value scenario is ascertained, the service provider provides the requested communications service according to the best-value scenario.

This invention discloses methods, systems, and products for providing communications services. One of the embodiments describes a method for providing communications services. This method receives a request for communications service. The request for communications service originates from a client communications device associated with a user and requests communications service from a service provider. An availability of at least one of i) a communications network operated by the service provider and ii) another communications network operated by another service provider is dynamically assessed in real-time. A best-value scenario of segmentation, dispersion, assemblage, and routing of electronic data is assessed to fulfill the request. The best-value scenario maximizes profitability for the service provider. The communications service is provided to fulfill the request according to the best-value scenario.

Other embodiments of this invention describe a system for providing communications services. The system includes a Analysis Module stored in a memory device, and a processor communicates with the memory device. The Analysis Module receives a request for communications service. The request for communications service originates from a client communications device associated with a user, and the request for communications service requests communications service from a service provider. The Analysis Module dynamically assesses in real-time an availability of at least one of i) a communications network operated by the service provider and ii) another communications network operated by another service provider. The Analysis Module ascertains a best-value scenario of segmentation, dispersion, assemblage, and routing of electronic data to fulfill the request, with the best-value scenario maximizing profitability for the service provider. The communications service is then provided to fulfill the request, and the communications service is provided according to the best-value scenario.

Other embodiments of this invention describe a computer program product. A computer-readable medium stores a Analysis Module. The Analysis Module receives a request for communications service. The request for communications service originates from a client communications device associated with a user, and the request for communications service requests communications service from a service provider. The Analysis Module dynamically assesses in real-time an availability of at least one of i) a communications network operated by the service provider and ii) another communications network operated by another service provider. The Analysis Module ascertains a best-value scenario of segmentation, dispersion, assemblage, and routing of electronic data to fulfill the request, with the best-value scenario maximizing profitability for the service provider. The communications service is then provided to fulfill the request, and the communications service is provided according to the best-value scenario.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
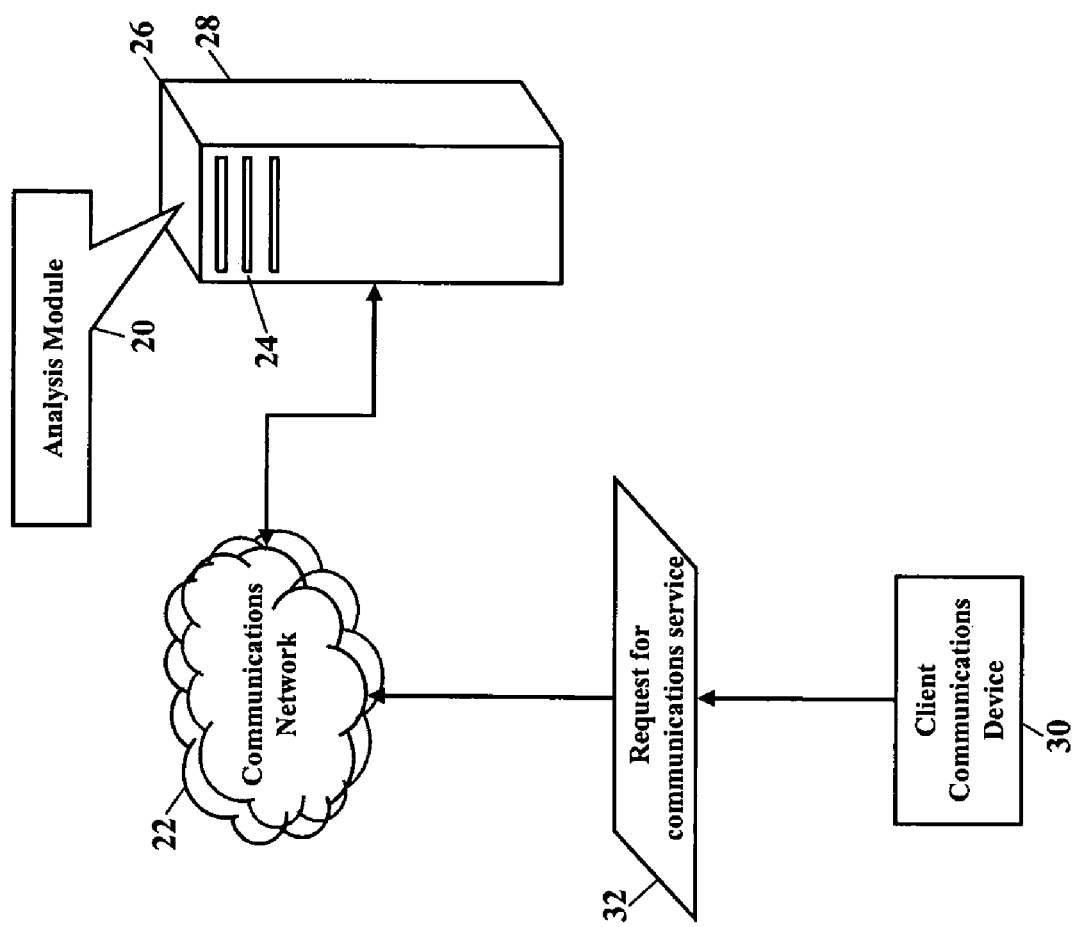
FIG. 1 is a schematic illustrating a Analysis Module operating within a communications network, according to one of the embodiments of this invention.

FIGS. 1-7 are schematics illustrating one of the embodiments of this invention. FIG. 1 shows a Analysis Module 20 operating within a communications network 22. This communications network 22 represents just one of the possible operating environments for the Analysis Module 20. The Analysis Module 20 is stored within memory 24 of a computer device 26, such as a service provider's computer server 28 communicating with the communications network 22. Each time a client communications device 30 requires communications service, the Analysis Module 20 receives a request 32 for communications service from the client communications device 30. The request 32 for communications service requests communications service via the communications network 22.

The client communications device 30 sends and receives data. When the client communications device 30 requires communications service, the term "communications service"

means the client communications device 30 requests a data upload and/or a data download via a communications network. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. The client communications device 30 may include any computer/communications device utilizing a microprocessor and/or a digital signal processor. The client communications device 30 may include, for example, a computer (laptop, desktop, tablet, server, and other computer systems), a personal digital assistant (PDA), a Global Positioning System (GPS) device, an interactive television, an Internet Protocol (IP) phone, a pager, and/or a cellular/satellite phone.

The Analysis Module 20 receives the request 32 for communications service. The client communications device 30 communicates the request 32 for communications service to the computer server 28, and thus the Analysis Module 20, via the communications network 22. The request 32 for communications service requests communications service from a service provider of the communications network 22. As the following figures illustrate, the Analysis Module 20 then determines a best-value scenario for providing the requested communications service. The term "best-value scenario," as used herein, means the Analysis Module 20 strives to maximize profit for the service provider given one or more constraints when providing the requested communications service. The term "best-value scenario," for example, might mean the lowest cost routing arrangement. The term "best-value scenario," however, might also mean a maximum profitability for the service provider and/or network operator. The term "best-value scenario" could also mean maximizing profit while still satisfying a Service Level Agreement. Once the best-value scenario is ascertained, the requested communications service is provided according to the best-value scenario.

Figure 2:
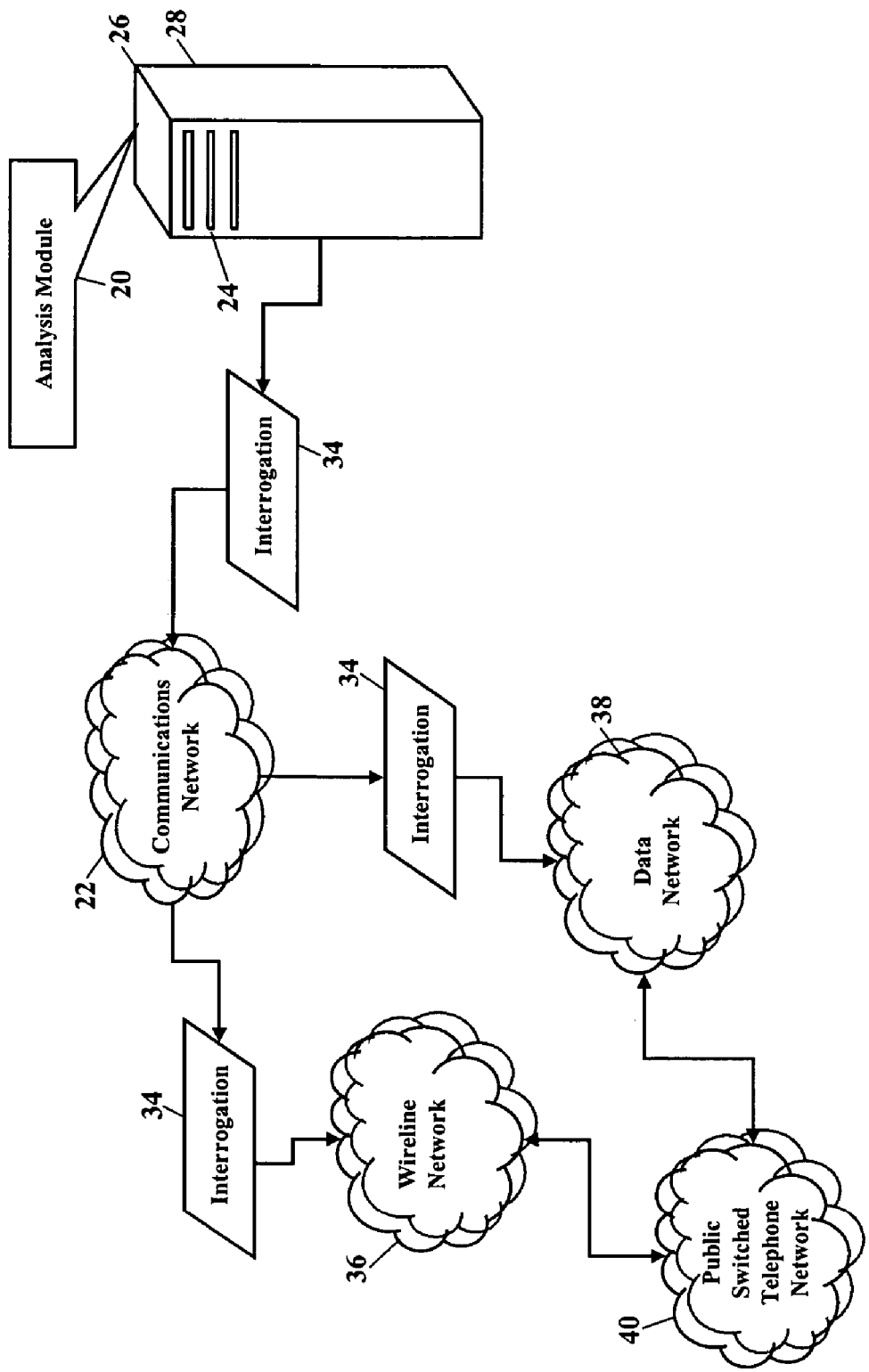
FIGS. 2-4 are schematics illustrating an assessment of routing availability and bandwidth, according to more embodiments of this invention.

FIG. 2 illustrates an assessment of routing availability and bandwidth. When the computer server 28 receives the request for communications service (shown as reference numeral 32 in FIG. 1), the Analysis Module 20 analyzes the request and determines what data is requested. The Analysis Module 20 then dynamically, and in real-time, assesses an availability of the communications network 22 operated by the service provider. The Analysis Module 20 also dynamically, and in real-time, assesses an availability of other communications networks operated by other service providers. The Analysis Module 20 determines the best-value scenario for fulfilling the request for data, even if another service provider's communications network is more profitable.

Figure 3:
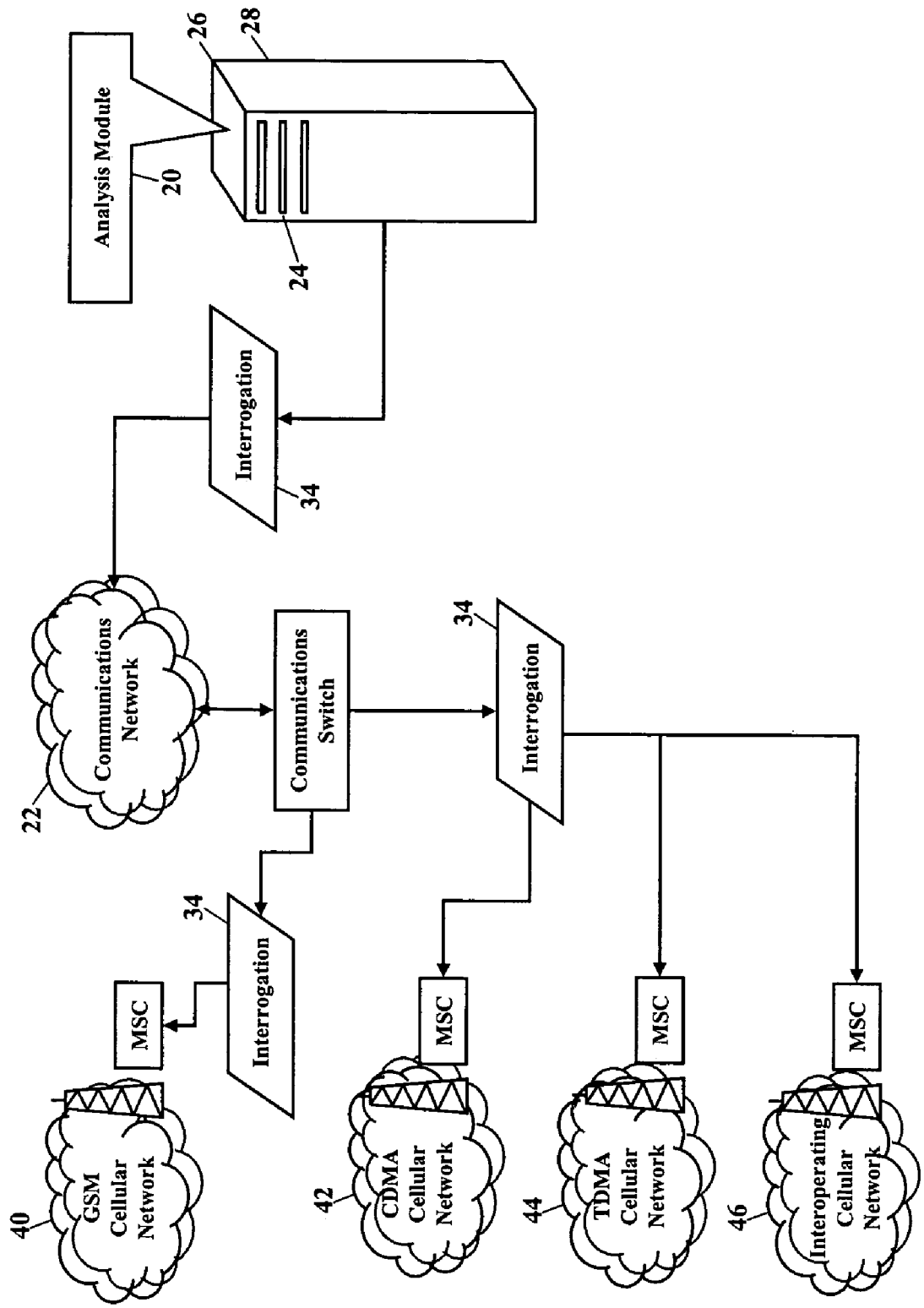
Figure 4:
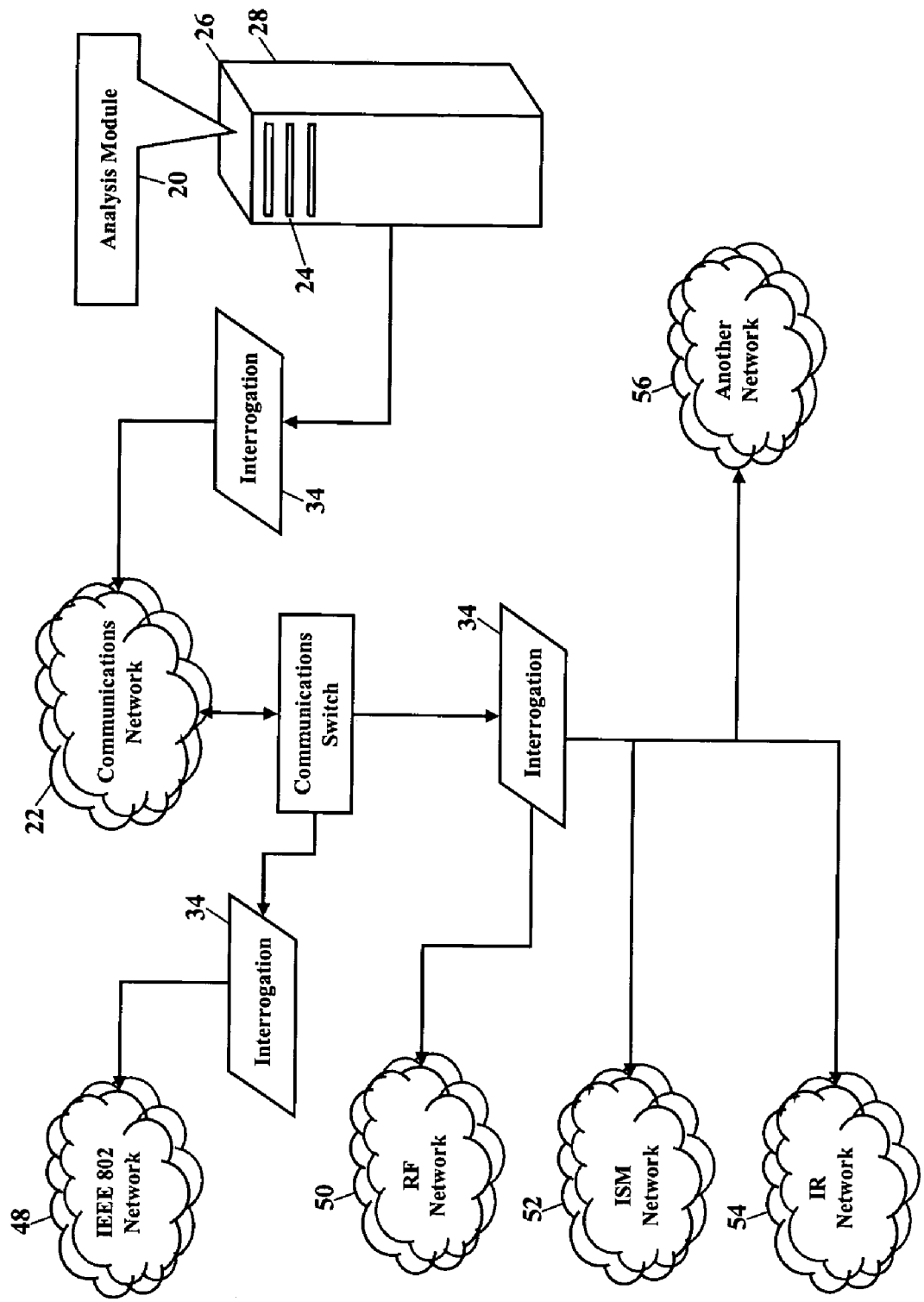

As FIGS. 2-4 show, the Analysis Module 20 interrogates other service providers communications networks. The Analysis Module 20 dynamically, and in real-time, assesses an availability of other communications networks operated by other service providers. If another service provider can provide the requested communications service for a cheaper price, a higher performance, or some other criteria, then the Analysis Module 20 may determine that it's more profitable and/or more advantageous to "subcontract" some or all of the requested communications service. The Analysis Module 20 communicates an interrogation 34 to the other service providers of the other communications networks. The interrogation 34 describes what data is requested, and the interrogation 34 includes any parameters for fulfilling the request for communications (shown as reference numeral 32 in FIG. 1). The interrogation also solicits the other service provider's available network routing, available bandwidth, and pricing. The Analysis Module 20, for example, sends the interrogation 34 to a wireline network 36 and/or a data network 38. The wireline network 36 is operated by another service provider and interfaces with the Public Switched Telephone Network 38. The data network 38 may also be operated by another service provider, and the data network 38 may interface with the Public Switched Telephone Network 38.

FIG. 3 shows that other interrogations 34 may be sent. The Analysis Module 20 may send the interrogation 34 to one or more wireless networks operated by other service providers. The Analysis Module 20, for example, sends the interrogation 34 to a GSM cellular network 40, a CDMA cellular network 42, a TDMA cellular network 44, and a GSM/CDMA/TDMA interoperating network 46. As those of ordinary skill in the art recognize, the GSM cellular network 40 operates using the Global System for Mobile (GSM) communications technology standard, the CDMA cellular network 42 operates using a Code Division Multiple Access (CDMA) communications technology standard, and the TDMA cellular network 44 operates using a Time Division Multiple Access (TDMA) communications technology standard. Those of ordinary skill in the art also recognize that the GSM/CDMA/TDMA interoperating network 46 may operate using a GSM-ANSI Interoperability Team (GAIT) communications technology standard, a combination CDMA/GSM technology standard, and/or a combination TDMA/CDMA technology standard.

As FIG. 4 shows, still more interrogations 34 may be sent. The Analysis Module 20 may send the interrogation 34 to even more wireless networks. These wireless networks may also include an I.E.E.E. 802 wireless network 48, an RF wireless network 50, an ISM wireless network 52, an IR wireless network 54, and another wireless network 56 using another portion of the electromagnetic spectrum. The I.E.E.E. 802 wireless network 48 utilizes any of the I.E.E.E 802 family of wireless technology standards. The RF wireless network 50 uses the radio frequency (RF) portion of the electromagnetic spectrum, the ISM wireless network 52 uses the Industrial, Scientific, and Medical (ISM) band of the electromagnetic spectrum, the IR wireless network 54 uses the infrared (IR) portion of the electromagnetic spectrum, and the another wireless network 56 utilizes any other portion/frequency within the electromagnetic spectrum.

Each service provider then evaluates their available network routing, available bandwidth, and pricing. When each service provider receives the interrogation 34, each service provider determines whether the service provider can fulfill the user's request for communications (shown as reference numeral 32 in FIG. 1). The service provider utilizes various commands, queries, tactics, and instructions for assessing the availability of routing and bandwidth. The service provider, for example, may send addressable "ping" packets throughout their communications network. The elapsed travel time for the addressable "ping" packets helps determine response times, network congestion, and/or bandwidth. The service provider may also utilize UNIX/LINUX "trace" commands or tracing features to monitor packet activity within computer devices and within their communications network. Each service provider may also utilize software routines to help assess the availability of routing and bandwidth. These software routines autonomously monitor activity within specified path(s), regions, computer devices, and/or the entire communications network. The service provider may also utilize allocation tables and/or routines to help assess the availability of routing and bandwidth. These allocation tables and/or routines contain relationships, preferences, and/or designations for various network routing paths and/or various computer devices. The allocation tables and/or routines identify, or even mandate, circumstances when certain routings or certain computer devices are required.

Figure 5:
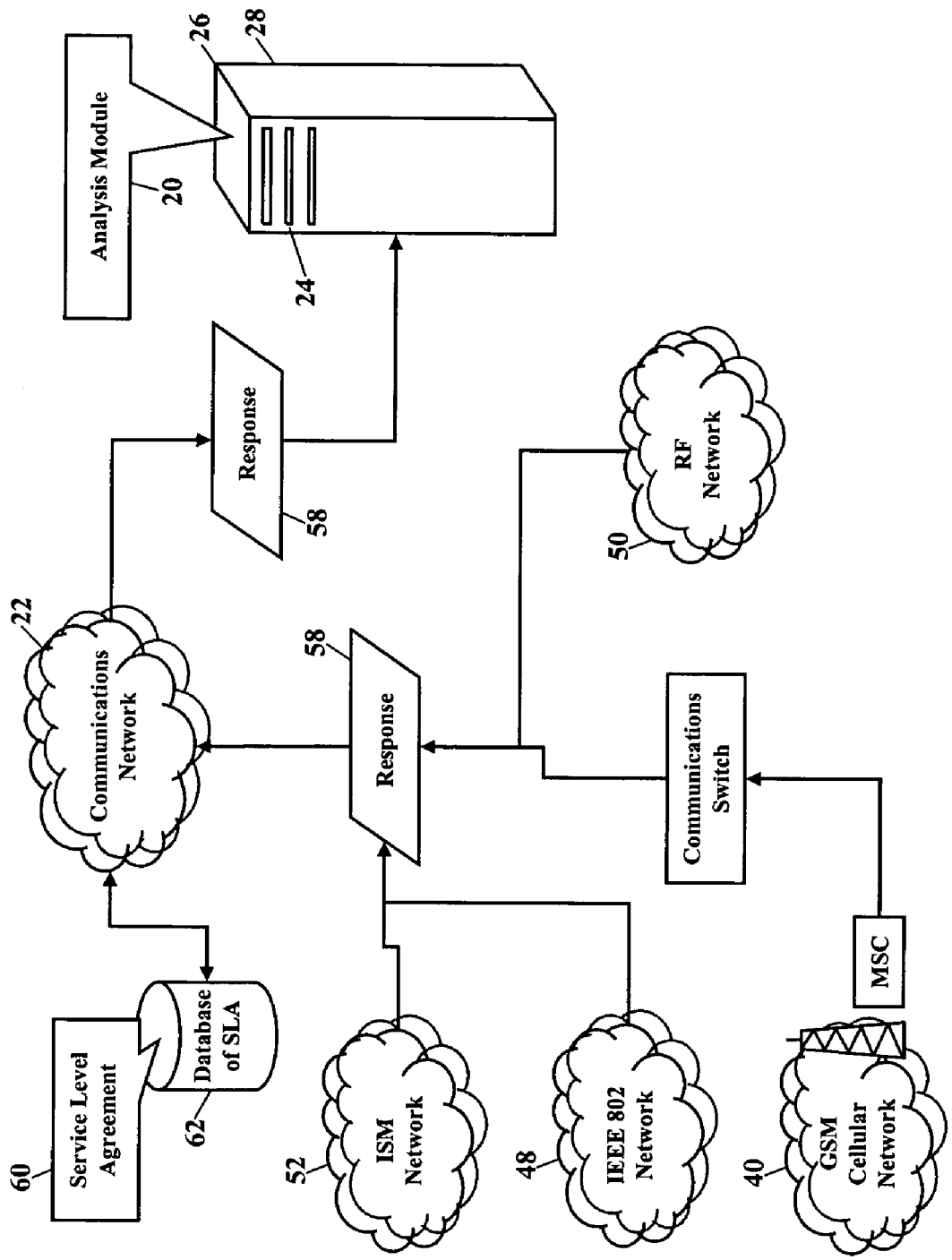
FIG. 5 is a schematic illustrating a response, according to still more embodiments of this invention.

FIG. 5 is a schematic illustrating a response 58. When each service provider of each communications network receives the interrogation 34, each service provider evaluates their available network routing, available bandwidth, and pricing. Those service providers having available routing and bandwidth return communicate the response 58. The response 58 includes available network routing, available bandwidth, and pricing for each responding service provider. FIG. 5 shows the Analysis Module 20 receiving/gathering each submitted response 58. The Analysis Module 20 evaluates each response 58 and ascertains a best-value scenario of segmentation, dispersion, assemblage, and routing of electronic data to fulfill the request. The best-value scenario maximizes profitability for the service provider. That is, the best-value scenario may simply be a lowest-cost scenario for providing the communications service. The best-value scenario, however, may alternatively or additionally include a lowest-cost scenario for formatting the electronic data according to a processing, storage, and/or audio/display characteristic of the client communications device (shown as reference numeral 30 in FIG. 1). The Analysis Module 20 ascertains the best-value scenario by utilizing any single communications network, regardless of the service provider. The Analysis Module 20 may also ascertain that the best-value scenario includes a combination of multiple communications networks operated by other service providers.

The best-value scenario may reflect a Service Level Agreement 60. As FIG. 5 illustrates, if a Service Level Agreement defines parameters for the user's requested communications service, the Analysis Module 20 retrieves the Service Level Agreement 60 from a database 62 of Service Level Agreements (SLA). The Analysis Module 20 then ascertains the best-value scenario that maximizing profitability for one or more service providers while still satisfying the Service Level Agreement 60.

Figure 6:
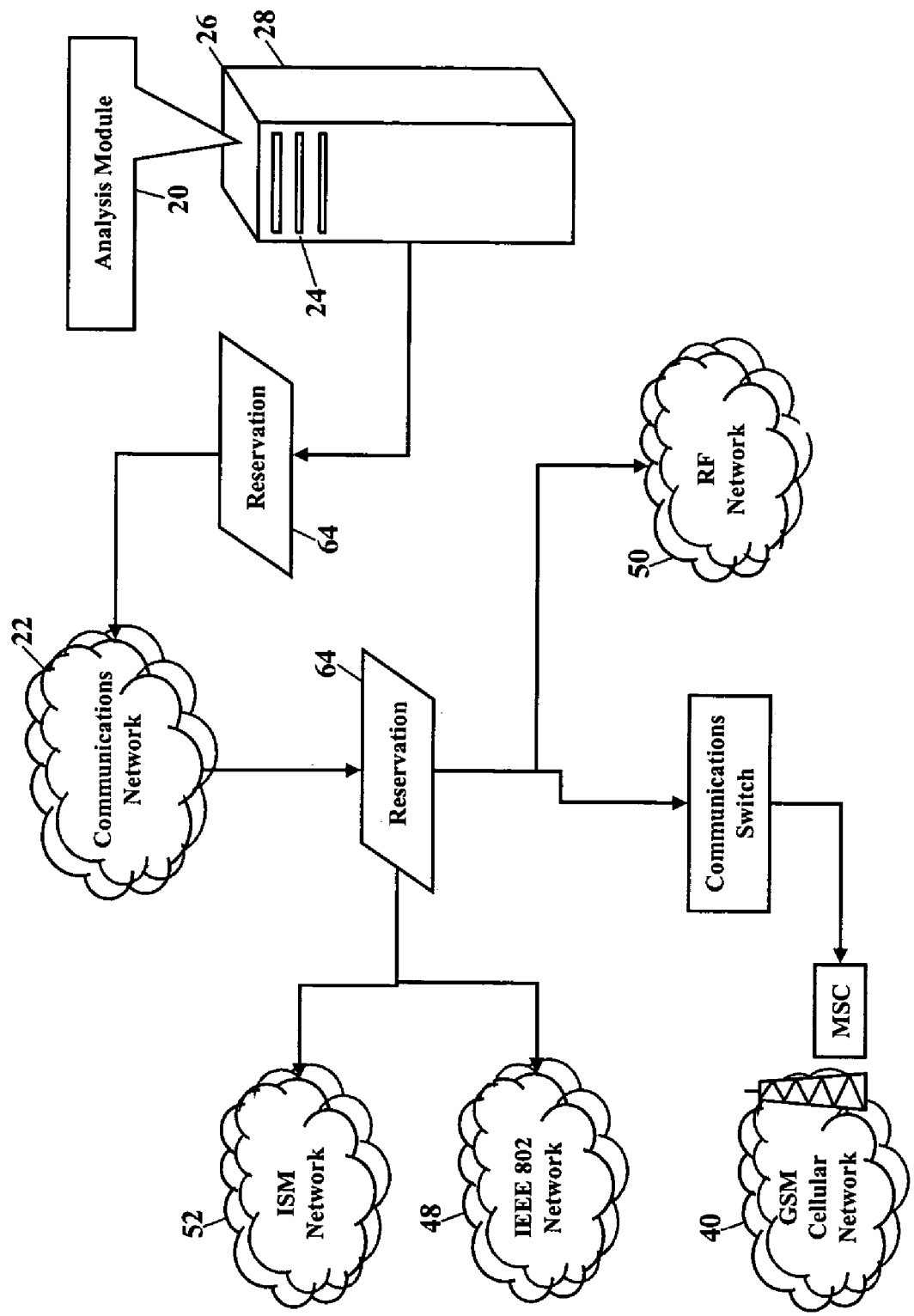
FIG. 6 is a schematic illustrating a reservation, according to one of the embodiments of this invention.

FIG. 6 is a schematic illustrating one or more reservations 64. Once the Analysis Module 20 assesses the best-value scenario, the Analysis Module 20 may then "reserve" routing paths and/or computer devices. The Analysis Module 20 issues one or more addressable reservations 64 to help ensure the best-value scenario is accomplished. Each reservation 64 instructs a networked computer device to anticipate, and perhaps only accept, packets of data destined for the reserved paths and/or computer devices. Each reservation 64 may instruct networked computer devices to anticipate, and perhaps only accept, packets having recognized header information and/or packet content. Each reservation 64 may also include a chronology component that specifies a "window" within which the reserved packets must be received, processed, and/or communicated. Packets arriving outside this window may not receive preferential access/routing and would be queued according to more conventional strategies (e.g., sequential, first in-first out, chronological). Because the Analysis Module 20 issues one or more of the addressable reservations 64, the Analysis Module 20 is able to reduce/avoid packet infighting.

Figure 7:
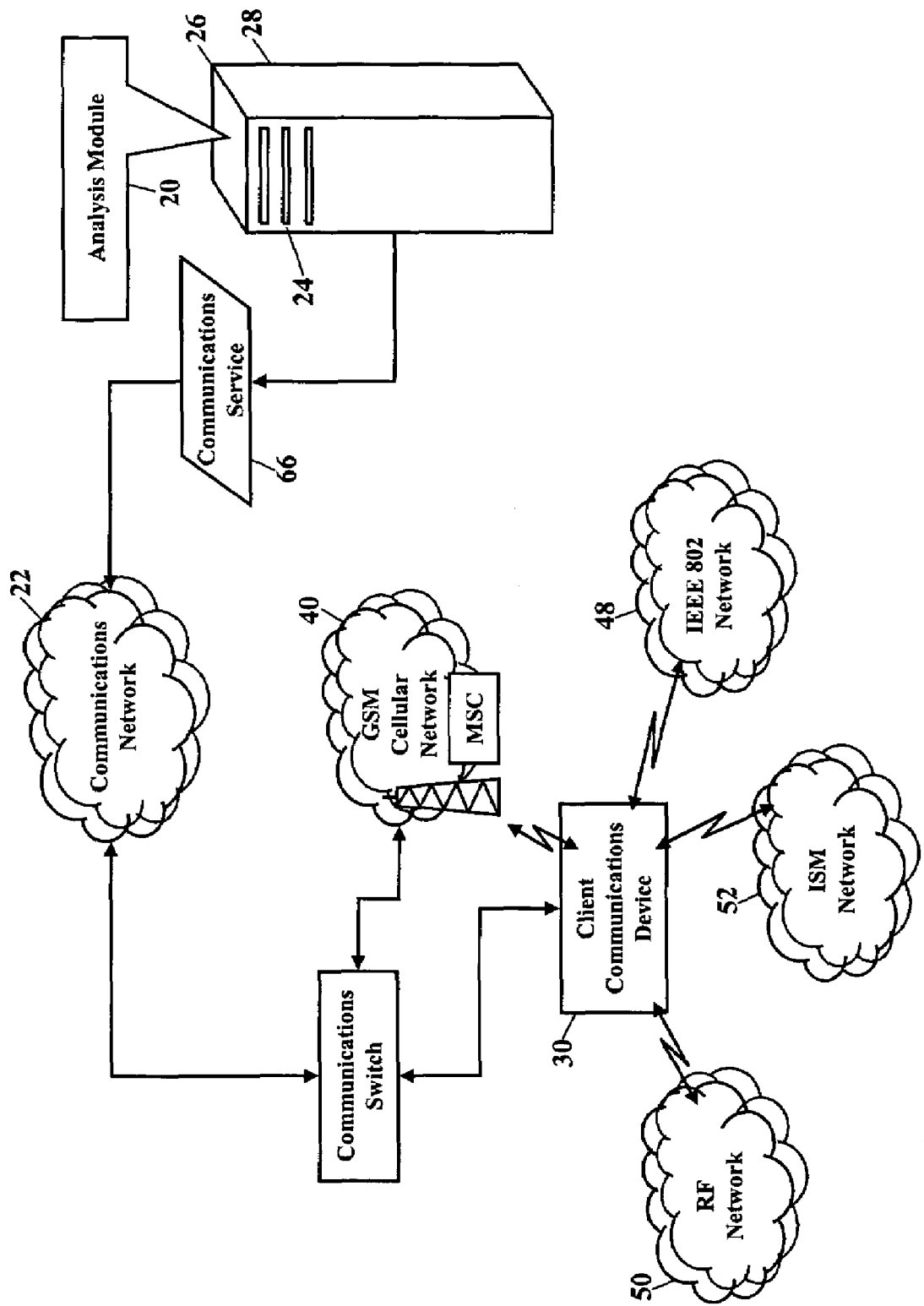
FIG. 7 is a schematic illustrating fulfillment of a request for communications service, according to another of the embodiments of this invention.

Now that the best-value scenario is ascertained, FIG. 7 shows the fulfillment of the request. The Analysis Module 20 has analyzed the request for communications service (shown as reference numeral 32 in FIG. 1), determined what data is requested, and solicited routing and bandwidth availability from competing service providers. The Analysis Module 20 then ascertained a best-value scenario of segmentation, dispersion, assemblage, and routing of electronic data to fulfill the request for communications service. The Analysis Module 20 now provides the communications service 66 to fulfill the request, and the communications service 66 is provided according to the best-value scenario. As FIG. 7 illustrates, the communications service 66 may be provided by utilizing any single communications network and/or by utilizing multiple communications networks. If multiple communications networks are utilized, the multiple communications networks may be operated by a single service provider, or the multiple communications networks may be operated by multiple service providers. The best-value scenario may be provided by any combination of one or more wireline networks and/or one or more wireless networks.

Figure 8:
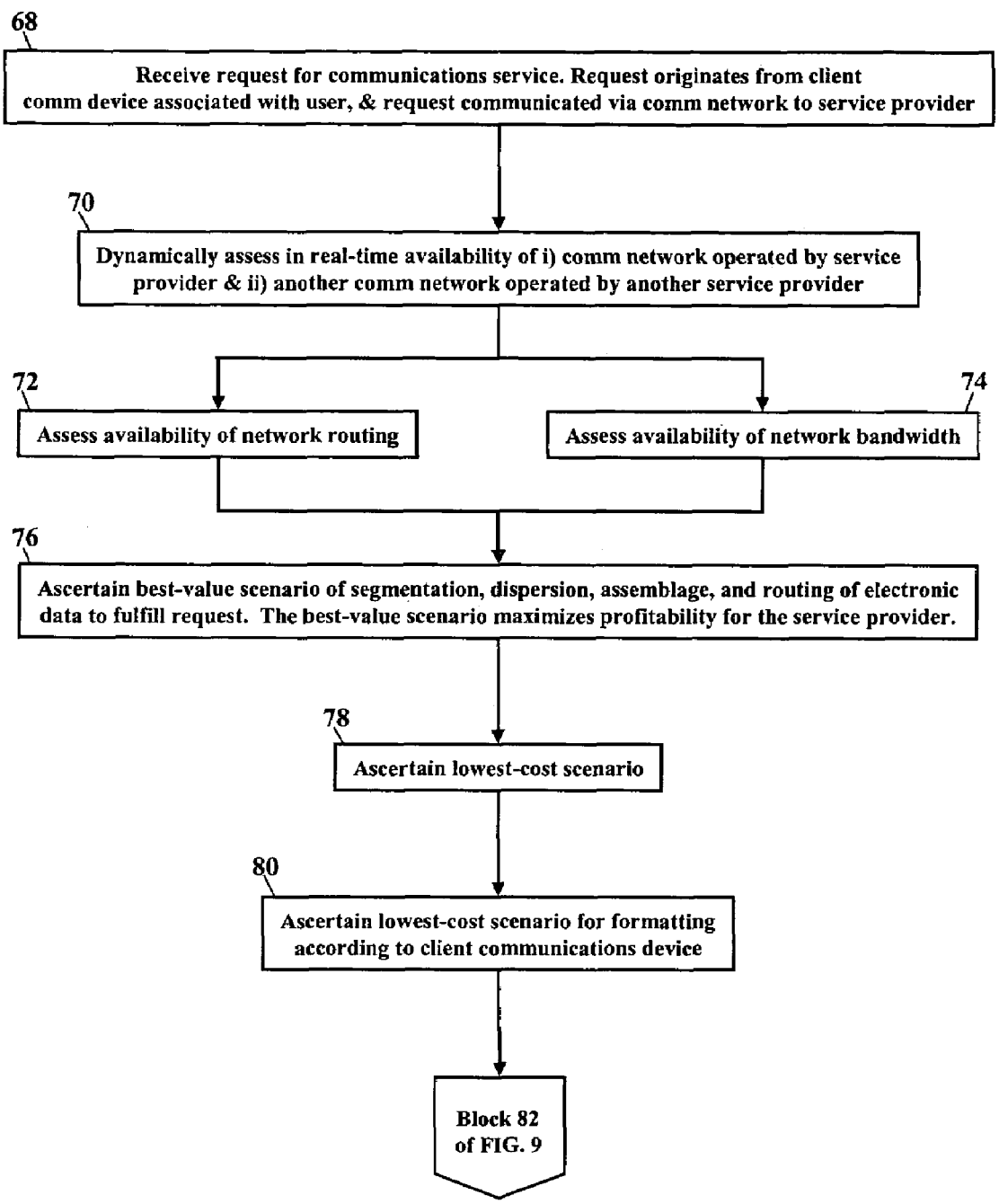
FIGS. 8 and 9 are flowcharts illustrating a method of providing communications service.

FIG. 8 is a flowchart illustrating a method of providing communications services. A request for communications service is received (Block 68). The request for communications service originates from a client communications device associated with a user. The request for communications service requests communications service from a service provider. An availability of at least one of i) a communications network operated by the service provider, and ii) another communications network operated by another service provider, is dynamically assessed in real-time (Block 70). The availability of network routing (Block 72) and/or the availability of network bandwidth (Block 74) may be assessed. A best-value scenario of segmentation, dispersion, assemblage, and routing of electronic data is ascertained to fulfill the request (Block 76). The best-value scenario maximizes profitability for the service provider. The best-value scenario may ascertain a lowest-cost scenario for providing the communications service (Block 78). The best-value scenario may ascertain a lowest-cost scenario for formatting the electronic data according to a characteristic of the client communications device (Block 80).

Figure 9:
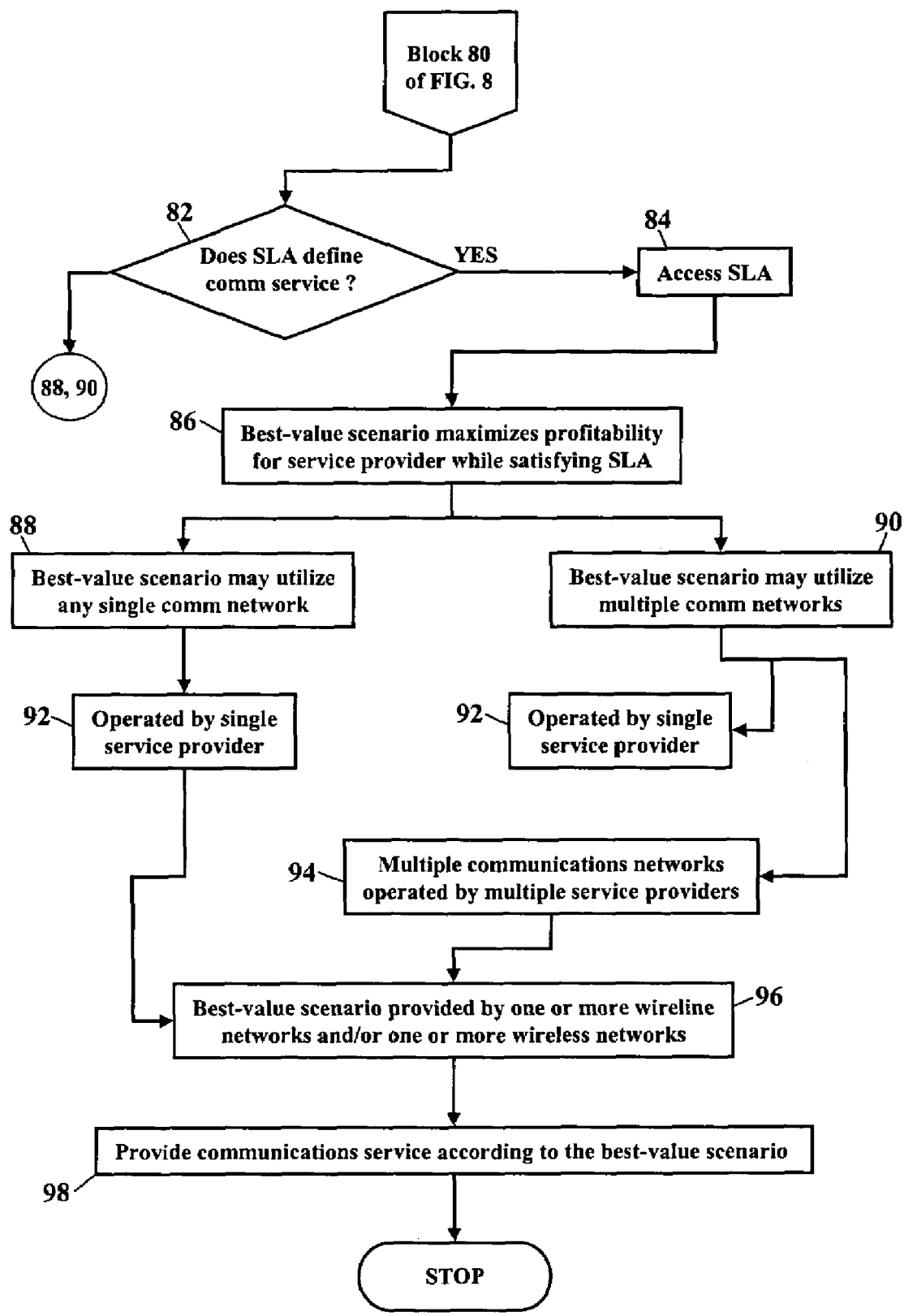

The flowchart continues with FIG. 9. If a Service Level Agreement (SLA) defines the communications service (Block 82), then the Service Level Agreement is accessed (Block 84) and the best-value scenario maximizes profitability for the service provider while satisfying the Service Level Agreement (Block 86). The best-value scenario may utilize any single communications network (Block 88) or utilize multiple communications networks (Block 90). If multiple communications networks are utilized, the multiple communications networks may be operated by a single service provider (Block 92), or the multiple communications networks may be operated by multiple service providers (Block 94). The best-value scenario may be provided by any combination of one or more wireline networks and/or one or more wireless networks (Block 96). The communications service is provided to fulfill the request (Block 98), and the communications service is provided according to the best-value scenario.

The Analysis Module (shown as reference numeral 20 in FIGS. 1-15) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module receives a request for communications service. The request for communications service originates from a client communications device associated with a user, and the request for communications service requests communications service from a service provider. The Analysis Module dynamically assesses in real-time an availability of at least one of i) a communications network operated by the service provider and ii) another communications network operated by another service provider. The Analysis Module ascertains a best-value scenario of segmentation, dispersion, assemblage, and routing of electronic data to fulfill the request, with the best-value scenario maximizing profitability for the service provider. The communications service is then provided to fulfill the request, and the communications service is provided according to the best-value scenario.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:
    receiving a request for communications service, the request for communications service originating from a client communications device associated with a user, the request for communications service requesting communications service from a service provider;
    dynamically assessing in real-time an availability of i) a communications network operated by the service provider and ii) another communications network operated by a different service provider;
    when a subcontracted processing service is required, interrogating the different service provider to fulfill the subcontracted processing service;
    ascertaining a best-value scenario that maximizes profitability for the service provider, the best value scenario comprising at least one of segmentation, dispersion, assemblage, and routing of electronic data to fulfill the request;
    grouping together individual packets of data as a segment, each of the individual packets of data in the segment requiring the subcontracted processing service;
    dispersing the segment to the different service provider for fulfillment of the subcontracted processing service;
    receiving a result of the subcontracted processing service from the different service provider; and
    providing the communications service to fulfill the request, the communications service provided according to the best-value scenario.

2. A method according to claim 1, further comprising determining a subcontracted color correction service is required for the individual packets, and wherein grouping together the individual packets comprises grouping together the individual packets requiring the subcontracted color correction service offered by the different service provider, and wherein receiving the result comprises receiving the result of the subcontracted color correction service.

3. A method according to claim 1, further comprising assessing in real-time an availability of network routing in the another communications network operated by the different service provider.

4. A method according to claim 1, further comprising subcontracting the subcontracted processing service to the different service provider.

5. A method according to claim 1, wherein grouping together the individual packets comprises grouping together the individual packets that require a subcontracted scaling service offered by the different service provider, and wherein receiving the result comprises receiving the result of the subcontracted scaling service.

6. A method according to claim 1, wherein ascertaining the best-value scenario comprises ascertaining a lowest-cost scenario for formatting the electronic data according to a characteristic of the client communications device.

7. A method according to claim 1, wherein ascertaining the best-value scenario comprises ascertaining a lowest-cost scenario for providing the communications service.

8. A method according to claim 1, further comprising accessing a Service Level Agreement defining parameters for the communications service requested by the user.

9. A method according to claim 8, wherein ascertaining the best-value scenario comprises maximizing profitability for the service provider while satisfying the Service Level Agreement.

10. A method according to claim 1, further comprising utilizing the another communications network operated by the different service provider to provide the communications service.

11. A method according to claim 1, further comprising:
    sending a reservation to reserve a routing path, the reservation including an instruction to only accept the packets of data having recognized header information and packet content, the reservation specifying a window of time within which the packets of data must be received; and
    when the packets of data arrive outside the window of time, then further comprising queuing the packets of data.

12. A method according to claim 1, wherein providing the communications service comprises utilizing at least one of i) a wireline network operated by the different service provider and ii) a wireless network operated by the different service provider.

13. A method according to claim 1, wherein providing the communications service comprises utilizing at least one of i) cellular network operated by the different service provider, ii) an I.E.E.E. 802 wireless network operated by the different service provider, iii) a radio frequency (RF) wireless network operated by the different service provider, iv) an Industrial, Scientific, and Medical (ISM) wireless network operated by the different service provider, v) an infrared (IR) wireless network operated by the different service provider, and vi) a wireless network operated by the different service provider using another portion of the electromagnetic spectrum.

14. A system for providing communications service, comprising:
    means for receiving a request for communications service, the request for communications service originating from a client communications device associated with a user, the request for communications service requesting communications service from a service provider;
    means for dynamically assessing in real-time an availability of i) a communications network operated by the service provider and ii) another communications network operated by another service provider;

when a processing service is required, means for interrogating the another service provider to fulfill the processing service;

means for ascertaining a best-value scenario that maximizes profitability for the service provider, the best-value scenario comprising at least one of segmentation, dispersion, assemblage, and routing of electronic data to fulfill the request;

means for grouping together individual packets of data as a segment, each of the individual packets of data in the segment requiring the processing service;

means for dispersing the segment to the another service provider for fulfillment of the processing service;

means for receiving a result of the processing service from the another service provider; and means for providing the communications service to fulfill the request, the communications service provided according to the best-value scenario.

15. A computer program product comprising a computer readable medium storing processor-executable instructions for performing a method, the method comprising:

receiving a request for communications service, the request for communications service originating from a client communications device associated with a user, the request for communications service requesting communications service from a service provider;

dynamically assessing in real-time an availability of i) a communications network operated by the service provider and ii) another communications network operated by another service provider;

when a processing service is required, interrogating the another service provider to fulfill the processing service;

ascertaining a best-value scenario that maximizes profitability for the service provider, the best-value scenario comprising at least one of segmentation, dispersion, assemblage, and routing of electronic data to fulfill the request;

grouping together individual packets of data as a segment, each of the individual packets of data in the segment requiring the processing service;

dispersing the segment to the another service provider for fulfillment of the processing service;

receiving a result of the processing service from the another service provider; and providing the communications service to fulfill the request, the communications service provided according to the best-value scenario.

16. The system according to claim 14, further comprising means for grouping together the individual packets requiring a color correction service offered by the another service provider, and means for receiving the result of the color correction service.

17. The system according to claim 14, further comprising means for subcontracting the processing service to the another service provider.

18. The system according to claim 14, further comprising means for grouping together the individual packets that require a sealing service offered by the another service provider, and means for receiving the result of the scaling service.

19. The computer program product according to claim 15, further comprising instructions for grouping together the individual packets requiring a color correction service offered by the another service provider, and instructions for receiving the result of the color correction service.

20. The computer program product according to claim 15, further comprising instructions for subcontracting the processing service to the another service provider.

* * * * *